Patent [19] [11] 4,292,648
Kowal [45] Sep. 29, 1981

[54] COLOR CORRECTOR FOR A COMPOSITE COLOR VIDEO SIGNAL

[75] Inventor: Leonard Kowal, Saratoga, Calif.

[73] Assignee: Ampex Corporation, Redwood City, Calif.

[21] Appl. No.: 28,303

[22] Filed: Apr. 9, 1979

[51] Int. Cl.³ .......................... H04N 5/76; H04N 5/78
[52] U.S. Cl. .......................................... 358/8; 360/36
[58] Field of Search ................ 360/26, 36; 358/8, 19, 358/21 R, 31

[56] References Cited

U.S. PATENT DOCUMENTS

| | | | |
|---|---|---|---|
| 3,507,983 | 4/1970 | Leman | 360/36 X |
| 3,872,497 | 3/1975 | Amery et al. | 358/31 X |
| 3,996,606 | 12/1976 | Pritchard | 358/21 X |
| 4,137,547 | 1/1979 | Yamamitsu et al. | 358/8 |
| 4,145,705 | 3/1979 | Yoshinaka | 358/8 |
| 4,157,565 | 6/1979 | Kuniyoshi et al. | 360/36 X |

Primary Examiner—Bernard Konick
Assistant Examiner—Aristotelis M. Psitos
Attorney, Agent, or Firm—Fitch, Even, Tabin, Flannery & Welsh

[57] ABSTRACT

An improved color corrector is disclosed which is of the type that separates the color burst component from a color video signal and uses the color burst in a phase locked loop to generate a continuous color subcarrier signal that is used to provide frequency and phase error correction of the chroma component of the color video signal. The corrector uses a wide bandwidth phase locked loop and has means for adding a color corrected chroma component from a present horizontal line of the video signal to a color corrected chroma component delayed by one horizontal line to cancel other circuit induced phase errors that are present due to the use of the wide bandwidth phase locked loop and the gating of the color burst thereto using a horizontal sync related burst gate signal.

7 Claims, 3 Drawing Figures

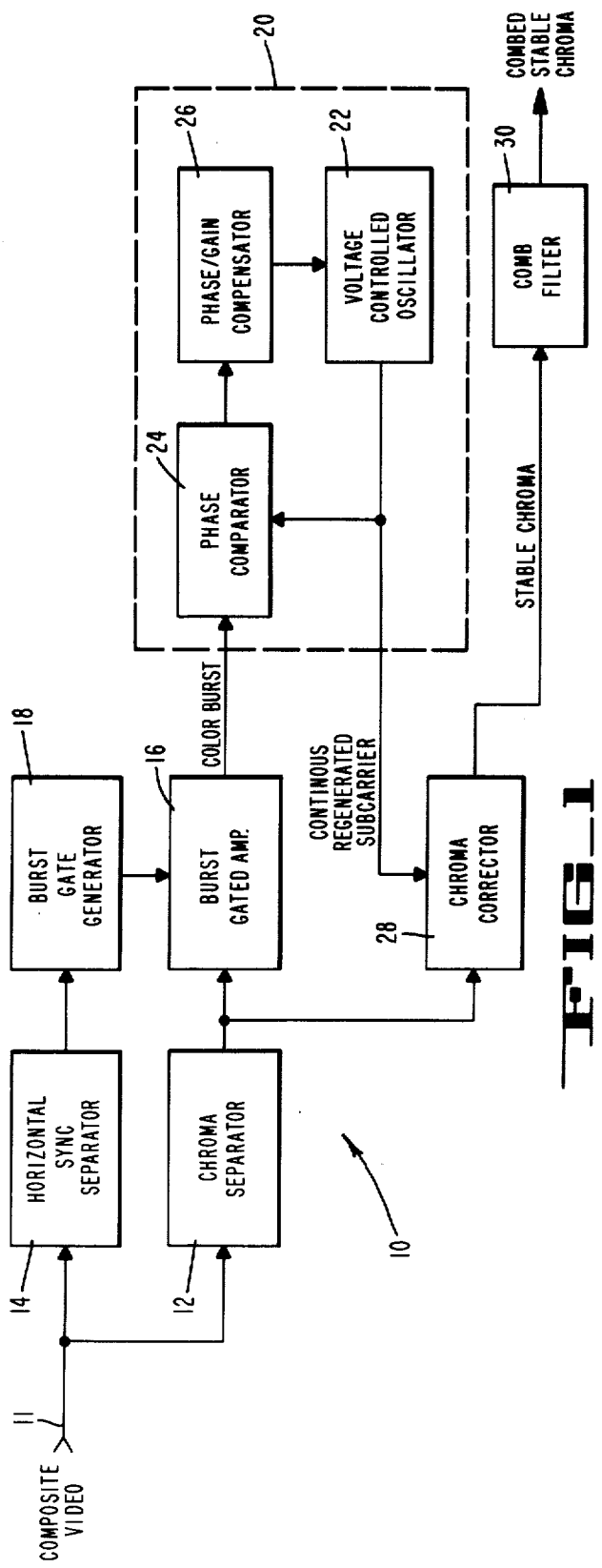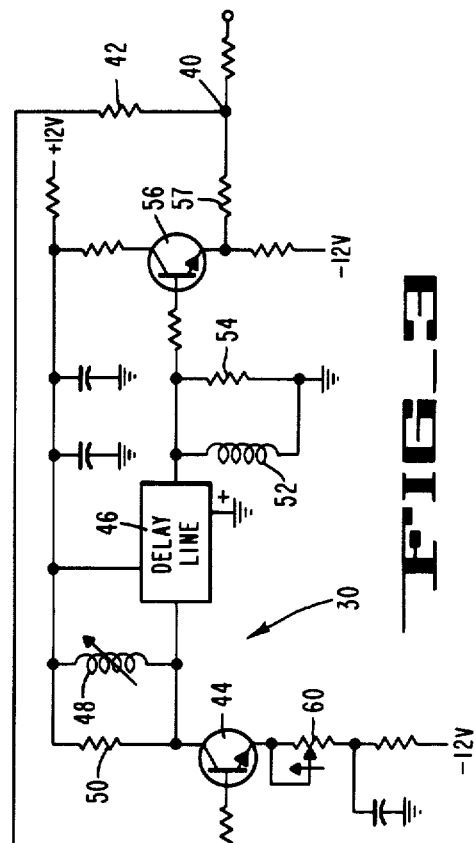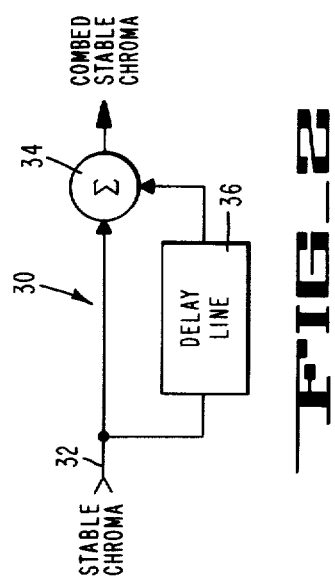

COLOR CORRECTOR FOR A COMPOSITE COLOR VIDEO SIGNAL

This invention relates to a device for correcting the frequency and phase errors in a composite color video signal, and more particularly in a composite color television signal having an unstable chrominance component.

Video signals are composite signals carrying luminance and chrominance information and synchronizing components. The synchronizing components repeat at known periodic intervals and include the horizontal and vertical synchronization pulses. A color burst synchronizing component occurs immediately following the horizontal sync pulses.

When a composite color video signal is reproduced from a storage media such as magnetic tape, timing errors are introduced because of a number of factors such as changes in relative humidity and temperature, for example, which detrimentally affect the resulting composite video signal. While small timing errors do no appreciably affect the luminance component, they can severely impair the quality of the chroma, because the chroma information is phase modulated on a color subcarrier. To maintain reasonable good reproduction of the color content of a NTSC video color signal, which utilizes a 3.58 MHz color subcarrier, the phase error should be limited to about ±4 degrees and this requires timing errors no greater than about ±3 nanoseconds.

Color correctors have been developed which deal with the correction of time base errors of the reproduced chrominance component of a composite color television signal. One such color corrector for use with a NTSC signal format uses a filter as a first step to separate the color burst from composite signal. The color burst is extracted from the chrominance signal using the horizontal synchronizing signal of the composite signal to generate a burst gate pulse, which is used to switch on a burst gate amplifier when the color burst occurs and pass the color burst to a phase locked loop circuit. The phase locked loop has a voltage controlled oscillator, a phase comparator circuit, and phase and gain compensation circuitry that locks the circuit to the phase of the color burst passed by the burst gate amplifier. The output of the phase locked loop oscillator is a continuous, 3.58 MHz regenerated subcarrier signal containing the time base error of the composite signal. The regenerated subcarrier is used to stabilize the unstable chrominance signal by using a well known heterodyning technique. The resulting stable chrominance signal is then recombined with the luminance component to provide a color corrected composite video signal.

It is noted that by utilizing the horizontal synchronizing signal to gate the burst to the phase locked loop circuitry, a reasonably high frequency spurious signal component is introduced to the phase locked loop circuitry which results in an error component at the output of the phase comparator that produces significant chroma error. However, this error occurs at precisely one-half the horizontal synchronization frequency of nominally 7.867 kHz because of the inherent relationship of the chrominance subcarrier and the fact that burst is gated to the phase locked loop circuitry using the horizontal sync related gating signal.

It should be understood that examination of the NTSC composite video signal reveals that the relationship of the chroma subcarrier is such that it is an odd multiple of one-half the horizontal sync frequency. Since the gating of burst to the phase locked loop circuitry is derived from horizontal sync, it should also be realized that the phase of burst changes by 180° with respect to the horizontal sync derived burst gate signal for each occurrence of the burst. The practical consequence of this relationship is that the spurious error component that is introduced to the phase locked loop circuit and which therefore appears at the output of the phase comparator section of the phase locked loop circuitry is an error component that is precisely at a frequency of one-half the horizontal sync frequency.

Prior art color correctors eliminated this undesirable error by limiting the bandwidth of the phase locked loop to insure that it will not follow this relatively high frequency error. Therefore, no significant chroma error would be present at the output of the color corrector. However, by limiting the bandwidth of the phase locked loop to prevent it from responding to this spurious error component, its ability to follow legitimate high frequency time base errors is also limited. These legitimate high frequency time base errors are therefore present in the output of the color corrector which adversely affects the quality of the video picture.

Accordingly, it is an object of the present invention to provide an improved system for color correcting a composite color video signal having an unstable chrominance component.

Further, it is another object of the present invention to provide an improved system of the type described which substantially eliminates burst gating induced chroma errors.

Still a further object of the present invention is to provide an improved system of the type described which substantially eliminates burst gating induced chroma errors without constraining the bandwidth of the phase locked loop circuitry.

It is a more detailed object of the present invention to provide a system of the type described which permits the burst gating induced errors to pass through the phase locked loop circuitry and which utilizes the inherent characteristics of the relationship of the error to the video signal to eliminate these errors near the output of the color corrector.

Other objects and advantages of the present invention will become apparent to those skilled in the art upon reading the following description, in connection with the accompanying drawings, wherein:

FIG. 1 is a schematic block diagram of the device of the present invention;

FIG. 2 is a schematic block diagram of the comb filter in FIG. 1; and

FIG. 3 is a schematic diagram of the comb filter in FIG. 1.

Broadly stated and referring to FIG. 1, there is shown a color corrector 10 embodying the present invention which corrects chroma hue errors resulting from time base errors of a composite NTSC color video signal that may be produced during reproduction by a video tape recorder, not shown. Very generally, the color corrector 10 extracts the color burst from the composite signal and uses the color burst to regenerate a chroma subcarrier signal that is then used as an error correcting signal for stabilizing the chrominance component. The stabilized chrominance component can thereafter be recombined with the corresponding separated luminance component to form a color corrected composite video signal.

More specifically, the composite signal containing both the chrominance and luminance components is applied at an input 11 of the color corrector 10 to both a chrominance separator 12 and a horizontal sync separator 14. The chrominance separator 12 can take any one of a number of forms, but is generally a band pass filter centered at the color subcarrier frequency to pass the chrominance component along with the color burst. The output of the chrominance separator 12 is applied to a burst gated amplifier 16 which is controlled by a burst gate generator 18 and which provides the color burst to the phase locked loop circuitry indicated generally at 20.

A horizontal sync related burst gate pulse signal from the gate generator 18 is used to switch on the burst gated amplifier 16 only when color burst occurs so as to pass only the color burst to the phase locked loop 20. The burst gate pulse signal is generated through the operation of the horizontal sync separator 14 and the burst gate generator 18. The composite signal is applied to the sync separator 14 which detects and passes the horizontal synchronizing signal to the burst gate generator 18. The burst gate generator 18 uses the horizontal synchronizing signal to generate the burst gate signal which is applied to the burst gated amplifier 16 to thereby switch it on for a sufficient time to pass the burst through it. The 8 to 11 cycles of burst at the 3.58 MHz frequency are applied to a phase locked loop 20 and are used as a measure of the phase error of the off tape chroma relative to the regenerated color subcarrier. The purpose of the phase locked loop 20 is to produce a continuous regenerated color subcarrier from a voltage controlled oscillator 22 which is locked as intimately as possible to the frequency and phase of the color burst, and thereby contains the time base errors of the composite signal.

The phase locked loop 20 has a phase comparator 24 which has the output of the burst gated amplifier 16 containing the color burst applied to one input and the output of the voltage controlled oscillator 22 applied to another input. The phase comparator 24 compares the phase relationship of the color burst to that of the regenerated subcarrier and generates an error signal which is applied to a phase/gain compensator 26, the output of which is an error related voltage which is used to control the voltage controlled oscillator 22. The error signal effectively controls the output of the voltage controlled oscillator 22 and attempts to lock the phase and frequency of the regenerated subcarrier to the phase and frequency of the off-tape color burst. Since the time base error contained in the composite signal is also presumably contained in the color burst, the regenerated and continuous subcarrier also contains this time base error.

In keeping with the present invention, the regenerated subcarrier is used in processing the extracted chrominance component to eliminate time base errors which were present in the composite signal. Both the regenerated subcarrier and the unstable chrominance component are applied to a chroma corrector 28 which uses standard techniques such as heterodyning to stabilize the unstable chrominance component to correct or compensate for the chroma hue errors resulting from time base errors which were present in the composite signal. Another well known technique involves demodulating the signal into its quadrature components and the remodulating these components with a new stable subcarrier. In a typical heterodyne method, the chrominance component separated from the color video signal is beat against a frequency multiple of the regenerated subcarrier, to produce a higher frequency signal. This higher frequency signal is then beat against a product signal (formed by mixing a time stable subcarrier reference and another frequency multiple of the regenerated subcarrier) to produce a color corrected modulated color signal. In the demodulation-remodulation method, the chrominance component of the color video signal is reduced to its quadrature components by demodulating it typically against the unstable regenerated subcarrier. The quadrature component information is then used to modulate a new, time stable subcarrier reference, producing a color corrected modulated color signal.

It is noted that the bandwidth of the phase locked loop 20 is increased about 40 to 60 percent over the phase locked loop contained in typical color correctors of the prior art. This increase in bandwidth from about 6.5 kHz to a bandwidth within the range of about 9 kHz to 11 kHz is accomplished by increasing the gain of the phase locked loop 20, since the bandwidth is proportional to loop gain. By increasing the bandwidth of the phase locked loop 20, it will have higher frequency response and the regenerated subcarrier will contain high frequency time base errors. Therefore, when the unstable chrominance component is processed by the chroma corrector 28, these higher frequency time base errors will be corrected at the output of the chroma corrector 28. However, with the increased bandwidth, the burst gate induced time base error which occurs at about 7.867 kHz is also passed through the phase locked loop 20. Since this error is not present in the unstable chrominance as reproduced from a record medium, but is introduced in the regenerated subcarrier that is applied to the chroma corrector 28, a resulting chroma error will be present at the output of the chroma corrector 28.

In keeping with the present invention, it is noted that the burst gate induced error has certain properties of symmetry which permit it to be canceled from the output of the color corrector 10 by processing the stabilized chroma with a comb filter 20 having a delay time equal to the horizontal line duration. The error which is introduced by the gating function is complementary and symmetrical on a horizontal line-by-line basis. As an example, if the phase modulation produces a +10 degrees error on one horizontal line, a complementary −10 degrees error would be produced on the following horizontal line. This is true because the subcarrier frequency, which is the same as the frequency of the color burst, is an odd multiple of one-half the horizontal sync frequency and the horizontal synchronizing signal is used for gating the color burst through the burst gated amplifier 16 and the color burst changes phase by 180° on a line-by-line basis. Since the error is the product of these two very deterministic signals, i.e., the horizontal sync derived gating and the color burst, the error on a line-by-line basis will also be symmetrical and complementary. By adding the signal of each horizontal line with the signal of the previous horizontal line, this induced error can be canceled from the output of the the color corrector 10.

Referring to FIG. 2, the comb filter 30 has the frequency and phase corrected chrominance signal applied to an input line 32 which extends directly to one input of a summing circuit 34, and also through a delay line 36 to another input of the summing circuit 34. Since the time delay of the delay line 36 is preferably made equal to the horizontal line duration of the composite signal, the output of the summing circuit 34 will be the sum of the signals of each horizontal line and the previous horizontal line. Because the phase of the chrominance subcarrier in a NTSC color video signal changes by 180° with respect to the horizontal sync from one horizontal line to the next, the output of summing circuit 34 must be obtained by effecting a subtraction of the chrominance components received on line 32 to obtain the desired summation of the oppositely phased chrominance components of consecutive horizontal lines. The subtraction can be effected by placing a phase inversion means in one of the paths and adding the chrominance component of consecutive horizontal lines (as is done in the specific embodiment illustrated in FIG. 3) or by subtracting the chrominance component of consecutive horizontal lines. Since the error which was introduced by the burst gated generator 16 is symmetric and complementary on a line-by-line basis, the induced error is effectively eliminated by cancellation at the summing circuit 34.

It is noted that although the use of the comb filter 30 yields a stable chrominance component without the burst gate induced error, the value of the chrominance component at the output of the comb filter 30 for each horizontal line is changed to the average of the chrominance component of the present horizontal line and of the previous horizontal line. However, this does not appreciably degrade the quality of the resulting color picture that is produced. In fact, the technique of adding the chrominance components of adjacent horizontal lines is used extensively in the PAL format television system that is predominant in many European countries.

With respect to the detailed circuitry of the comb filter 30, and referring to FIG. 3, it has input line 32 to which the stabilized chrominance component is applied. The signal is directed along two paths to a summing junction 40. The first path is through a resistor 42 directly to the summing junction 40. The second path is through a transistor 44 which is connected as a common emitter amplifier and which acts as an impedance matching buffer and gain stage so as not to upset the termination of a glass delay line 46. The output of the transistor 44 is taken from its collector and fed to an input of the glass delay line 46. The Buffer stage contains a variable inductor 48 which is connected across a load resistor 50 for matching the input impedance of the glass delay line 46 to the output impedance of the transistor 44.

The glass delay line 46 has a delay time which is equal to the duration of one horizontal line. The delay line also acts as a chroma band pass filter which is centered at the subcarrier frequency of approximately 3.58 MHz. The output of the glass delay line 46, which is now inverted with respect to the input signal on line 32 because of the phase inversion caused by the common emitter amplifier 44, is applied to an impedance matching network consisting of an inductor 52 and a resistor 54 connected in parallel, and is then applied to a transistor 56 connected as an emitter follower. The emitter is connected to the summing junction 40, via resistor 57 and completes the delayed signal path to the summing junction. Since the delay time of the glass delay line 46 equals the time duration of one horizontal line and the delayed chrominance component is phase inverted relative to the undelayed chrominance component, the output of the summing junction 40 provides the average of the chrominance components of each horizontal line and of the previous horizontal line.

It is noted that the variable resistor 60 is connected to the emitter of the transistor 44 and is provided to adjust the gain of the amplifier circuit formed by transistor 44 and allow the signal level of the second path to be adjusted to equal the signal level of the first path. This is to insure that the signals added at the summing junction are equal tna compensate for any differences in attenuation experienced through the glass delay line 46. In one embodiment of the phase locked loop 20 employing the aforedescribed comb filter 30 illustrated by FIG. 3, a loop bandwidth of about 10 kHz was obtained.

It is noted that the present invention can also be applied to television formats other than the NTSC standard format, such as "color under" systems. In a color under system, the chrominance component which includes the color burst is separated from the luminance component, frequency translated down to a much lower frequency, and then recombined with the luminance component prior to recording. As long as the color burst is equal to an odd numbered multiple of one-half of the horizontal sync frequency, then the burst gate induced errors will be symmetrical and complementary on a line-by-line basis and can therefore be eliminated from the output of the color corrector by the use of a comb filter connected to the output of the chroma corrector. In the case of the color under system, if the translated frequency is a submultiple of the color burst then the translated frequency will be an odd numbered multiple of one-half of the horizontal frequency. Therefore, the present invention can also be used to eliminate burst gate induced errors in a system utilizing the color under format.

From the foregoing description, it may be seen that the present invention provides an improved color corrector for correcting chroma hue errors resulting from time base errors that are produced during reproducing of a composite color television signal by video recorders. The color corrector embodying the present invention uses the inherent properties of the composite signal and conventional color correcting circuitry to provide significant improved color correction without suffering the effects of burst gate induced errors. The color corrector embodying the present invention is able to effectively correct for high frequency time base errors which have not been corrected by color correctors of the prior art.

It should be undertood that although certain preferred embodiments of the present invention have been illustrated and described, various modifications, alternatives and equivalents thereof will become apparent to those skilled in the art and, accordingly, the scope of the present invention should be defined only by the appended claims and equivalents thereof.

Various features of the invention are set forth in the following claims.

What is claimed is:

1. A system for color correcting a composite color video signal having horizontal sync defining consecutive horizontal lines and having an unstable chrominance component containing time base errors, the system comprising:
    means for separating the chrominance component including color burst from said composite video signal;

means for separating the horizontal sync from said composite video signal;

means responsive to the horizontal sync for gating the color burst to a color subcarrier generating means;

means for generating a continuous color subcarrier signal that is substantially phase locked to the phase of the color burst;

means for stabilizing the unstable chroma component utilizing said continuous color subcarrier signal;

comb filter means including an input and a summing junction with two circuit paths coupled between said input and summing junction, said input being coupled to said stabilizing means for receiving the stabilized chroma component, one of said paths including a phase inversion means and a delay line serially coupled to said phase inversion means, said delay line having a time delay greater than the circuit time delay of the other of said paths by an amount equal to the time duration of one horizontal line of the color video signal.

2. The system of claim 1 wherein the generating means comprises a phase locked loop which locks the generated color subcarrier to the phase and frequency of the color burst.

3. The system of claim 2 wherein the bandwidth of the phase locked loop is within the range of about 9 kHz to about 11 kHz.

4. The system of claim 2 wherein the phase locked loop comprises:

oscillator means responsive to an error signal and operative to provide the generated color subcarrier signal whose frequency and phase is a function of the error signal; and means for comparing the phase of the color burst with the phase of the generated color subcarrier and producing said error signal and applying the same to the oscillator means for controlling the frequency and phase of the generated subcarrier signal, said error signal controlling the frequency and phase of the generated subcarrier signal so that it substantially equals the frequency and phase of said color burst.

5. The system of claim 4 wherein the oscillator means is a voltage controlled oscillator.

6. The device of claim 5 wherein the means for stabilizing the unstable chroma component is of the type which heterodynes the generated color subcarrier with the unstable chrominance component to produce a stable chrominance component.

7. A system as defined in claim 1 wherein said comb filter means includes means for varying the amplitude of said previous horizontal line chroma signal that is added to said stabilized chroma signal.

* * * * *